US008128307B2

(12) United States Patent
Giunta et al.

(10) Patent No.: US 8,128,307 B2
(45) Date of Patent: Mar. 6, 2012

(54) LOCKING STRUCTURE HAVING THREADED INSERT

(75) Inventors: Kenneth E. Giunta, Penfield, NY (US); Herman Young, Williamson, NY (US); Brian C. Cyr, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 869 days.

(21) Appl. No.: 12/193,810

(22) Filed: Aug. 19, 2008

(65) Prior Publication Data
US 2010/0043180 A1 Feb. 25, 2010

(51) Int. Cl.
B25G 3/00 (2006.01)
F16B 7/08 (2006.01)
F16B 9/00 (2006.01)
F16L 41/00 (2006.01)

(52) U.S. Cl. ............. 403/240; 403/258; 312/265.5; 108/147.16

(58) Field of Classification Search ............ 403/3, 4, 403/167, 168, 240, 258–260, 263, 294, 387; 312/257.1, 263, 265.5; 108/147.16, 193; 248/223.41, 224.51, 225.11
See application file for complete search history.

(56) References Cited

U.S. PATENT DOCUMENTS

| 456,588 | A | * | 7/1891 | McGrath | 411/15 |
| 2,993,573 | A | * | 7/1961 | Bloedow | 403/258 |
| 3,365,224 | A | * | 1/1968 | Thome | 217/65 |
| 3,498,655 | A | * | 3/1970 | Arms et al. | 52/285.2 |
| 3,967,432 | A | * | 7/1976 | Starr | 52/285.2 |
| 4,116,510 | A | * | 9/1978 | Franco | 312/257.1 |
| 4,188,148 | A | * | 2/1980 | Waibel | 403/258 |
| 4,601,621 | A | * | 7/1986 | Permoda | 411/182 |
| 4,782,635 | A | | 11/1988 | Hegle | |
| 4,859,108 | A | * | 8/1989 | Maddox | 403/277 |
| 4,874,212 | A | * | 10/1989 | Rock et al. | 312/330.1 |
| 5,076,596 | A | | 12/1991 | Jaggers | |
| 5,344,700 | A | | 9/1994 | McGath et al. | |
| 5,478,145 | A | * | 12/1995 | Kamachi | 312/263 |
| 5,595,454 | A | * | 1/1997 | Bogaerts et al. | 403/263 |
| 5,597,259 | A | * | 1/1997 | Bogaerts et al. | 403/263 |
| 5,683,197 | A | | 11/1997 | Pihl | |
| 5,777,266 | A | * | 7/1998 | Herman et al. | 174/68.1 |
| 6,032,004 | A | | 2/2000 | Mirabella, Jr. et al. | |
| 6,135,666 | A | * | 10/2000 | Kelly et al. | 403/256 |
| 6,135,788 | A | | 10/2000 | Wang et al. | |
| 6,353,966 | B1 | | 3/2002 | King | |
| 6,517,276 | B2 | | 2/2003 | Chen | |
| 6,694,568 | B2 | | 2/2004 | Baer | |
| 7,597,500 | B2 | * | 10/2009 | Gernez | 403/403 |
| 2009/0153006 | A1 | * | 6/2009 | Hazzard et al. | 312/348.4 |

* cited by examiner

Primary Examiner — Michael P Ferguson
Assistant Examiner — Nahid Amiri
(74) Attorney, Agent, or Firm — Gibb I.P. Law Firm, LLC

(57) ABSTRACT

A structure includes two plates (planar plates) joined at right angles to one another. The first plate has a non-round opening (first opening) and can include tabs extending from one end (a first end) of the first plate. The second plate has a round opening and/or a notch, depending upon implementation. The second plate can also include tab openings on opposite sides of the round opening, again depending upon implementation. If a notch is used, the notch is positioned along an edge of the second plate (positioned along a second end of the second plate). When the first and second plates are connected, the optional tabs are positioned within the optional tab openings, a first end of the first plate being connected to the second end of the second plate. A locking structure is positioned within the first opening, the round opening, and the notch (if used). The locking structure connects the first plate to the second plate.

20 Claims, 7 Drawing Sheets

LOCKING STRUCTURE HAVING THREADED INSERT

Embodiments herein generally relate to locking structures and more particularly to a locking structure that includes a threaded insert.

BACKGROUND AND SUMMARY

Within mechanical devices, there is often a need to join items together. For example, it is common to join planar surfaces at right angles to one another. This has been accomplished in the past using structures of varying complexity. For example, U.S. Pat. No. 6,694,568 (the complete disclosure of which is incorporated herein by reference) illustrates a relatively complex structure for joining items together at right angles that uses screws and bolts.

Similarly, U.S. Pat. No. 6,353,966 (the complete disclosure of which is incorporated herein by reference) discusses that a fastener can be inserted into an opening in order to join plates together. Other efforts have been directed to cut outs and blocking slots whereby plates can be assembled together without the need for screws or bolts (for example, see U.S. Pat. No. 6,517,276, the complete disclosure of which is incorporated herein by reference).

Additionally, different connection devices have used various inserts (some of which are threaded) to create an appropriate connector device (see U.S. Pat. Nos. 5,076,596 and 5,683,197, the complete disclosures of which are incorporated herein by reference). Also, other connecting structures have used drop-in slots that hold and retain nuts to allow bolts and screws to be joined to the connector structures (for example, see U.S. Pat. No. 6,135,788, the complete disclosure of which is incorporated herein by reference).

However, such conventional connection devices require the use of brackets, bolts, frames, and similar structures which increases the cost, complexity, and weight of the structure. The embodiments discussed below address these issues by using a simplified, lightweight, and inexpensive structure that utilizes a threaded insert having slots that fit within the opening of one plate and allow the first plate to be joined to a second plate at a right angle to the first plate by the use of a threaded member, such as a screw, bold, etc. This structure avoids the use of brackets, bolts, frames, and similar structures that are required conventionally and therefore saves cost, weight, and simplifies assembly.

Embodiments herein provide a structure that includes two plates (planar plates) joined at right angles to one another. Thus, the structure includes a one plate (a "first" plate) and another plate (a "second" plate) that are joined to one another.

The first plate has a non-round opening (first opening) and can include tabs extending from one end (a first end) of the first plate. The second plate has a round opening and/or a notch, depending upon implementation. The second plate can also include tab openings on opposite sides of the round opening, again depending upon implementation. If a notch is used, the notch is positioned along an edge of the second plate (positioned along a second end of the second plate).

When the first and second plates are connected, the optional tabs are optionally positioned within the optional tab openings, a first end of the first plate being connected to the second end of the second plate. A locking structure is positioned within the first opening, the round opening, and the notch (if used). The locking structure connects the first plate to the second plate.

The locking structure comprises a threaded member (screw, bolt, etc.) and a threaded insert. The threaded insert is a cube-shaped threaded structure and can have planar sides (can be a four-sided, six-sided, eight-sided, etc. structure); can have curved sides; or can have a combination of curved sides and planar sides.

If the notch embodiment is used, the threaded insert includes a post that fits through the round opening and the threaded member is positioned within the notch. If the notch embodiment is not used, the threaded member fits through the round opening. In either embodiment, a threaded opening within the threaded insert has threads corresponding to threads on the threaded member, and the threaded member fits screwably within the threaded opening. In other words, the threaded member is screwed into the threaded insert.

Further, the post and the threaded member are sized to fit through the round opening of the second plate. Also, the threaded member is sized to fit within the notch of the second plate.

The first opening comprises two continuous rectangular openings (is an irregularly shaped rectangular opening having two different sized rectangular portions). One of the rectangular openings (a "first" rectangular opening or portion) is larger than the other ("second") rectangular opening or portion. The second rectangular opening is positioned closer to the first end of the first plate than the first rectangular opening.

The exterior surface of the threaded insert has at least two exterior slots. The first rectangular opening is sized larger than the exterior surface of the threaded insert to allow the threaded insert to be placed within, and removed from the first rectangular opening. However, the smaller second rectangular opening is sized smaller than the exterior surface of the threaded insert, but larger than the exterior slots of the threaded insert. Therefore, the second rectangular opening fits within and is held by the exterior slots of the threaded insert. In other words, the exterior slots of the threaded insert are guided by and slide along the edges of the second rectangular opening. The exterior slots are on planar sides of the threaded insert that are perpendicular to a planar side in which the threaded opening is located. Further, the threaded member maintains the threaded insert within the second rectangular opening.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, conventional connection devices require the use of brackets, bolts, frames, and similar structures which increases the cost, complexity, and weight of the structure. The embodiments discussed below address these issues by using a simplified, lightweight, and inexpensive structure that utilizes a threaded insert having slots that fit within the opening of one plate and allow the first plate to be joined to a second plate at a right angle to the first plate by the use of a threaded member, such as a screw, bold, etc. This structure avoids the use of brackets, bolts, frames, and similar structures that are required conventionally and therefore saves cost, weight, and simplifies assembly.

Figure 1:
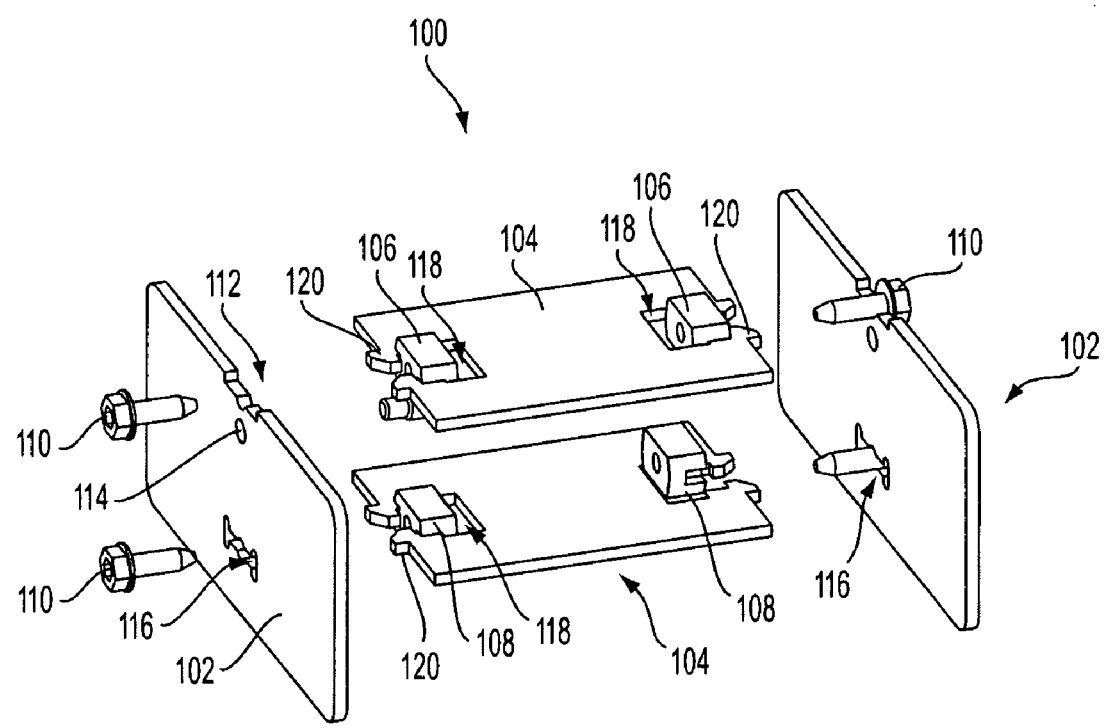
FIG. 1 is a schematic perspective view diagram of a locking structure according to embodiments herein.

As shown in FIG. 1, embodiments herein include a structure that includes two plates (planar plates) joined at right angles to one another. Thus, the structure includes one plate (a "first" plate 104) and another plate (a "second" plate 102) that are joined to one another. The plates can be made of any appropriate material, including metals, alloys, plastics, wood, polymers, ceramics, etc. As shown in FIG. 1, various embodiments can include one or more of the first plates 104 as well as one or more of the second plates 102.

Figure 2:
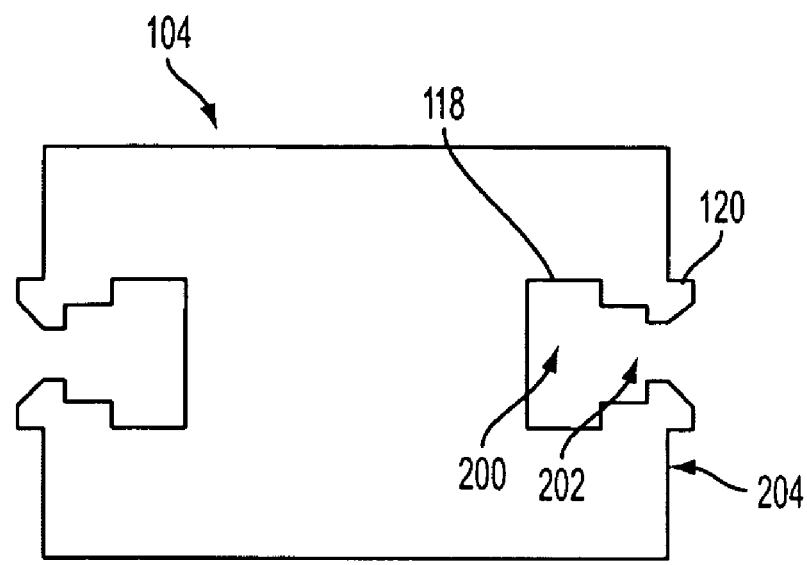
FIG. 2 is a schematic top view diagram of a plate structure according to embodiments herein.

The first plate 104 has a non-round opening (first opening 118) and can include tabs 120 extending from one end (a first end 204) of the first plate 104. One of the first plates 104 is shown in greater detail in FIG. 2. The first opening 118 comprises two continuous rectangular openings 200, 202 (is an irregularly shaped rectangular opening having two different sized rectangular portions). One of the rectangular openings (a "first" rectangular opening or portion 200) is larger than the other ("second") rectangular opening or portion 200. The second rectangular opening 202 is positioned closer to the first end 204 of the first plate 104 than the first rectangular opening 200.

The second plate 102 has a round opening 116 and/or a notch 112, depending upon implementation. While both the round opening 116 and the notch 112 are shown in the drawings, those ordinarily skilled in the art would understand that some embodiments can include only the round opening 116, other embodiments can include only the notch 112, and yet further embodiments could include both the round opening 116 and the notch 112.

Figure 3:
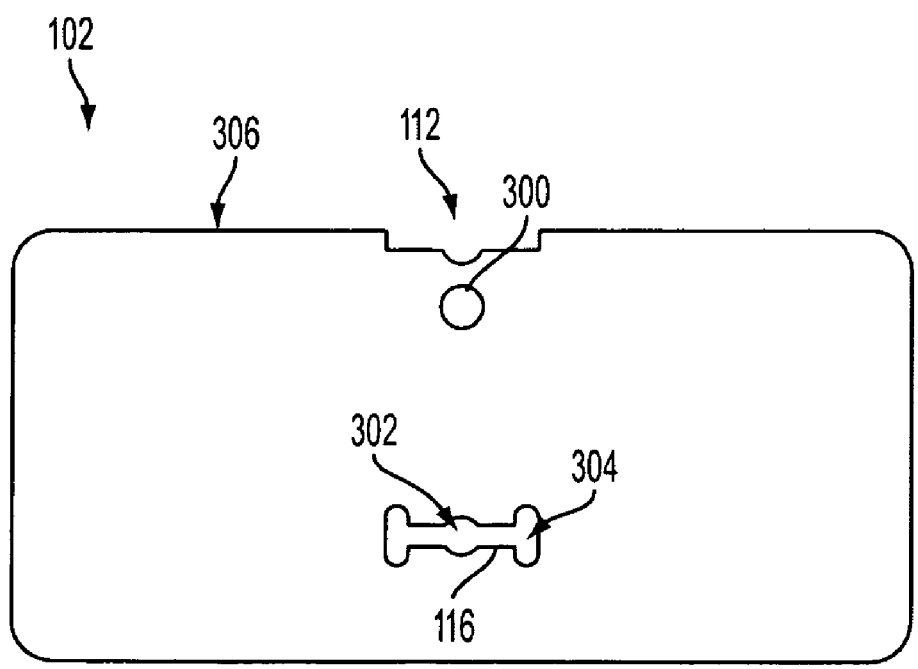
FIG. 3 is a schematic top view diagram of a plate structure according to embodiments herein.

The second plate 102 is shown in greater detail in FIG. 3. As shown therein, the round opening 116 can include a circular opening 302 and can optionally include tab openings 304 on opposite sides of the circular opening 302, again depending upon implementation. The tab openings 304 can be continuous with the circular opening 302, or can be separate therefrom.

If a notch 112 is used, the notch 112 is positioned along an edge of the second plate 102 (positioned along a second end 306 of the second plate 102). Further, notch 112 embodiments use a second round opening 300 into which a post (404) discussed below fits.

As shown in FIG. 1, when the first 104 and second 102 plates are connected, the optional tabs 120 (if used) are positioned within the optional tab openings 304. Thus, as shown in FIG. 1, the first end 204 of the first plate 104 is connected to the second end 306 of the second plate 102. A locking structure is positioned within the first opening 118, the round opening 116, and the notch 112 (if used). The locking structure thus connects the first plate 104 to the second plate 102.

The locking structure comprises a threaded member 110 (screw, bolt, etc.) and a threaded insert 106, 108. The threaded insert 106, 108 is a cube-shaped threaded structure having planar sides, and can be a four-sided, six-sided, eight-sided, etc. structure. Two exemplary threaded inserts 106, 108 are shown in FIG. 1. These threaded inserts 106, 108 are shown in greater detail in FIGS. 4-9. The threaded member 110 and threaded inserts 106, 108 can be made of any appropriate material, including metals, alloys, plastics, wood, polymers, ceramics, etc.

Figure 4:
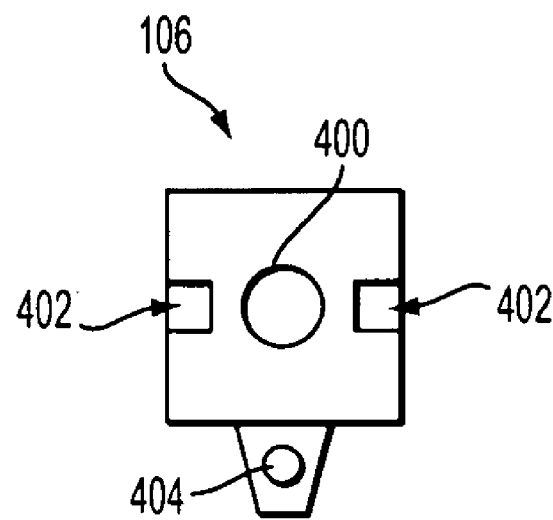
FIG. 4 is a schematic side view diagram of a threaded insert according to embodiments herein.
Figure 5:
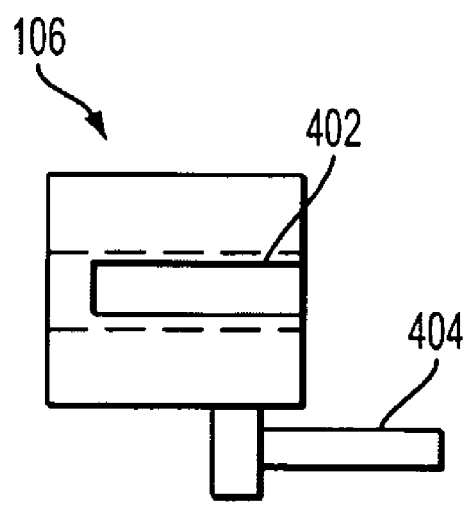
FIG. 5 is a schematic side view diagram of a threaded insert according to embodiments herein.
Figure 6:
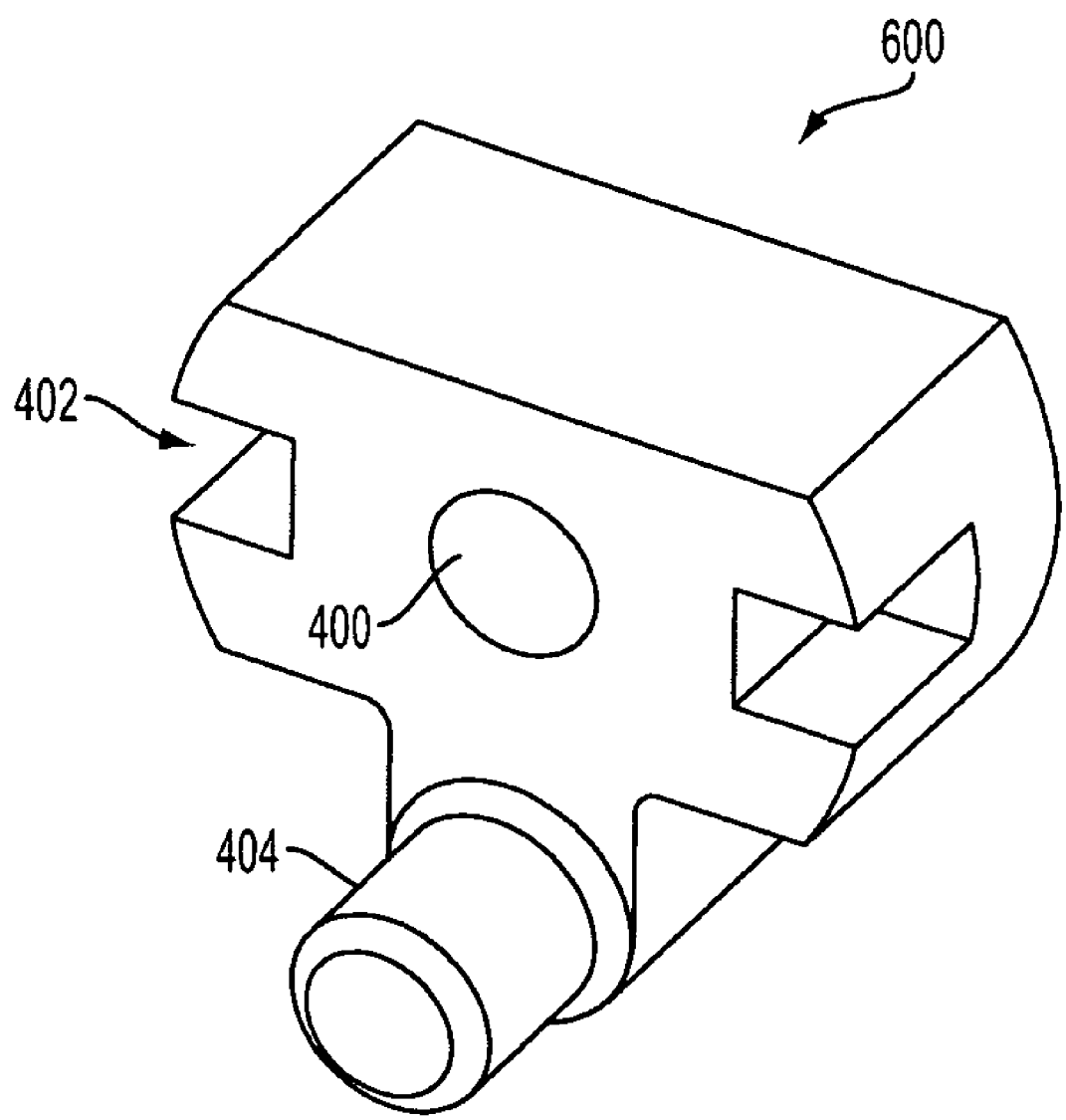
FIG. 6 is a schematic perspective view diagram of a threaded insert according to embodiments herein.
Figure 7:
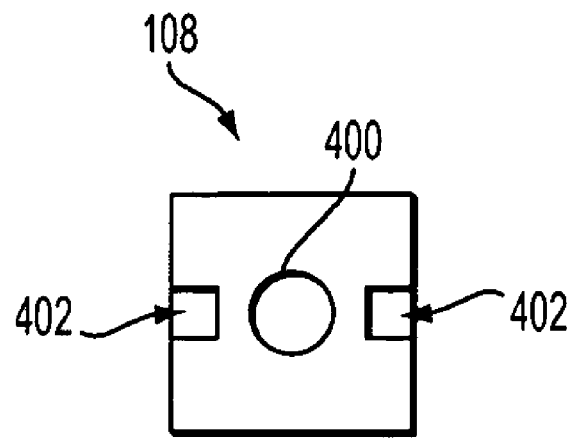
FIG. 7 is a schematic side view diagram of a threaded insert according to embodiments herein.
Figure 8:
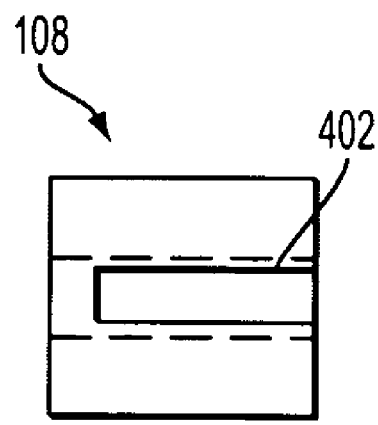
FIG. 8 is a schematic side view diagram of a threaded insert according to embodiments herein.
Figure 9:
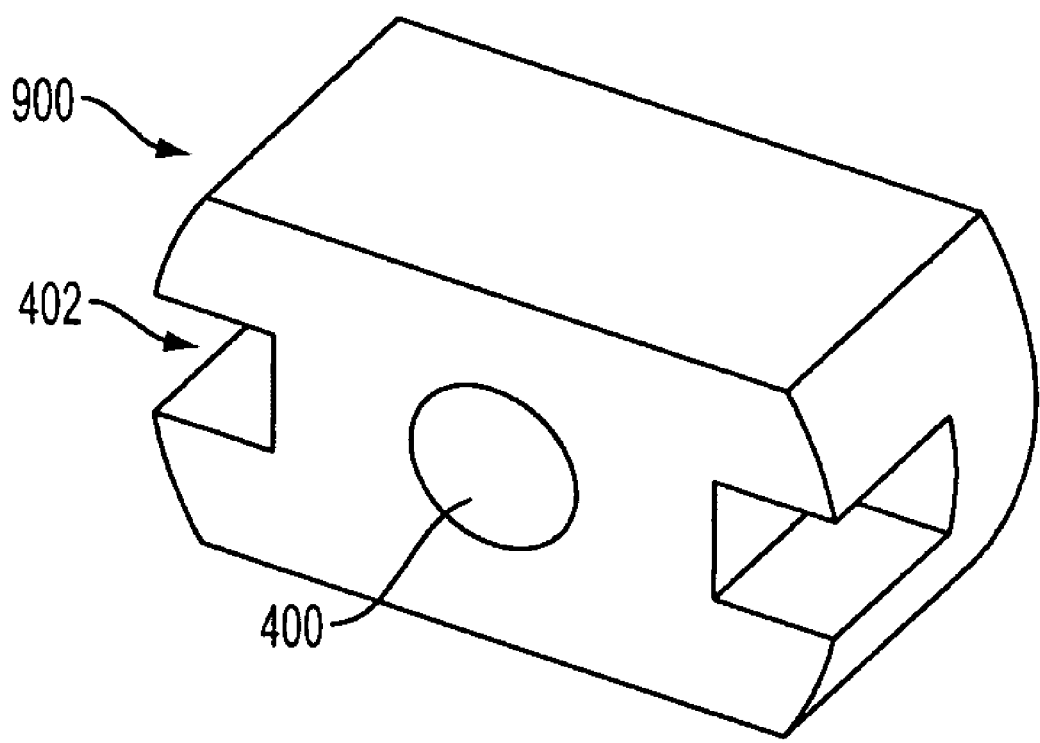
FIG. 9 is a schematic perspective view diagram of a threaded insert according to embodiments herein.

FIGS. 4 and 7 illustrate an end view of the cube-shaped threaded structures 106, 108 (from the perspective of the end of the threaded structure that includes the threaded opening 400). FIGS. 5 and 8 illustrate a side view of the cube-shaped threaded structures 106, 108 and FIGS. 5 and 8 view the threaded structures 106, 108 at a 90° angle with respect to the view shown in FIGS. 4 and 7. As mentioned above, the threaded structures 106, 108 can have any appropriate shape (planar four-sided, planar six-sided, etc., curved sides, etc.). Therefore, FIGS. 6 and 9 illustrate perspective views of the same threaded structures 106, 108; however these structures (labeled 600 and 900, respectively in FIGS. 6 and 9) have curved sides. The shape of the threaded structures will depend upon specific implementation. The principal difference between the embodiment shown in FIGS. 4-6 and the embodiment shown in FIGS. 7-9 is that the threaded insert 106, 600 includes a post 404 and the other threaded insert 108, 900 does not include such a post.

If the notch 112 is used, the threaded insert 106 that includes a post 404 is used within the locking structure. The post 404 fits through the round opening 300 and the threaded member 110 is positioned within the rounded portion of the notch 112 in notch embodiments. If the notch 112 is not used, the threaded member 110 fits through the round opening 116, and no notch 112 or round opening 300 would be utilized in such non-notch embodiments.

In either embodiment shown in FIGS. 4-9, a threaded opening 400 within the threaded insert 106, 108 has threads corresponding to threads on the threaded member 110, and the threaded member 110 fits screwably within the threaded opening 400. In other words, the threaded member 110 can be screwed into the threaded insert 106, 108.

Further, the threaded member 110 is sized to fit through the circular opening 302 and the curvature within the notch 112. The post 404 is sized to fit within the round opening 300 of the second plate 102.

Figure 10:
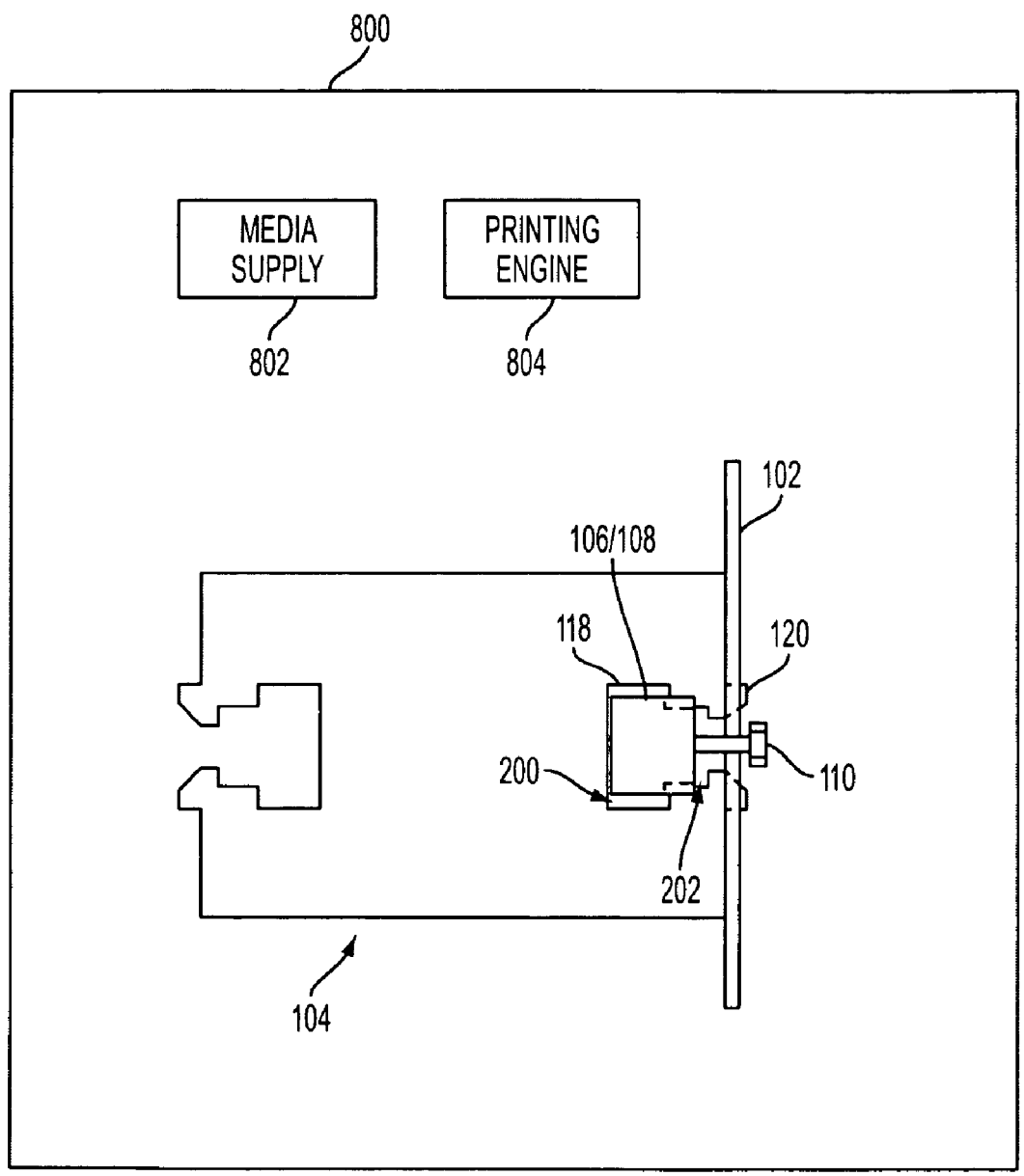
FIG. 10 is a schematic top view diagram of plate structures connected with a locking structure according to embodiments herein.

As shown in FIGS. 4-9, the exterior surface of the threaded insert 106, 108 has at least two exterior slots 402 on opposite sides of the threaded insert 106, 108. The exterior slots 402 are on planar sides of the threaded insert 106, 108 that are perpendicular to a planar side in which the threaded opening 400 is located. As shown in FIG. 10, these slots 402 allow the opening 118 to hold the threaded insert 106, 108. In addition, FIG. 10 illustrates the tabs 120 of the first plate 104 engaged within the tab openings 304 of the second plate 102.

More specifically, FIG. 10 illustrates a threaded insert 106, 108 that is partially positioned within the first rectangular opening 200 and partially within the second rectangular opening 200 and that is being drawn into the second rectangular opening 202 by the screwing action of the threaded member 110 within the threaded opening 400. FIG. 10 illustrates that the first rectangular opening 200 is sized larger than the exterior surface of the threaded insert 106, 108 to allow the threaded insert 106, 108 to be placed within, and removed from the first rectangular opening 200. However, the smaller second rectangular opening 202 is sized smaller than the exterior surface of the threaded insert 106, 108, but larger than the exterior slots 402 of the threaded insert 106, 108. Therefore, the sides of the second rectangular opening 202 fit within the exterior slots 402 of the threaded insert 106, 108 to hold the threaded insert 106, 108. In other words, the exterior slots 402 of the threaded insert 106, 108 are guided by and slide along the edges of the second rectangular opening 202.

Further, when the threaded member 110 is fully screwed into the threaded opening 400, the threaded member 110 maintains the threaded insert 106, 108 within the second rectangular opening 202. Therefore, the irregularly shaped rectangular opening, 118, the threaded insert 106, 108, and the threaded member 110 form a locking structure that connects the first end 204 of the first plate 104 to a second plate 102 at a 90° angle to one another.

FIG. 10 also illustrates that the locking structure can be utilized within a device 800, such as a printing devices that can include, for example, a media supply 802 and a printing engine 804. The printing device as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

What is claimed is:

1. A structure comprising:
a first plate comprising a first opening;
a second plate comprising a round opening and a notch, said notch being in a second end of said second plate and said round opening being adjacent to said notch, said second plate being connected to a first end of said first plate; and
a locking structure within said first opening, said notch and said round opening, said locking structure connecting said first plate to said second plate,
said locking structure comprising a threaded member and a threaded insert, said threaded insert comprising a threaded opening having threads corresponding to threads on said threaded member and a post adjacent to said threaded opening, said threaded member being positioned on said notch and further extending from said notch into and fitting screwably within said threaded opening and said post extending from said threaded insert through said round opening such that said post is parallel to said threaded member;
said threaded insert further comprising an exterior surface and at least two exterior slots in said exterior surface,
said first opening comprising two continuous rectangular openings, a first rectangular opening of said rectangular openings being larger than a second rectangular opening of said rectangular openings,
said second rectangular opening being positioned closer to said first end of said first plate than said first rectangular opening,
said first rectangular opening having a size larger than said exterior surface of said threaded insert, and
said second rectangular opening having a size smaller than said exterior surface of said threaded insert and larger than said exterior slots of said threaded insert such that said second rectangular opening fits within said exterior slots of said threaded insert.

2. The structure according to claim 1, said first plate and said second plate comprising planar plates.

3. The structure according to claim 1, said threaded insert comprising a cube-shaped threaded insert having planar sides.

4. The structure according to claim 3, said exterior slots being on planar sides of said threaded insert that are perpendicular to a planar side in which said threaded opening is located.

5. The structure according to claim 1, said threaded member maintaining said threaded insert in said second rectangular opening.

6. A structure comprising:
a first plate comprising a first opening;
a second plate comprising a round opening and a notch, said notch being positioned along a second end of said second plate, a first end of said first plate being connected to said second end of said second plate; and
a locking structure within said first opening, said round opening, and said notch, said locking structure connecting said first plate to said second plate,
said locking structure comprising a threaded member and a threaded insert, said threaded insert comprising a post and a threaded opening having threads corresponding to threads on said threaded member, said threaded member fitting screwably within said threaded opening;
said post having a size to fit through said round opening of said second plate,
said threaded member having a size to fit within said notch of said second plate,
said threaded insert further comprising an exterior surface and at least two exterior slots in said exterior surface,
said first opening comprising two continuous rectangular openings, a first rectangular opening of said rectangular openings being larger than a second rectangular opening of said rectangular openings,
said second rectangular opening being positioned closer to said first end of said first plate than said first rectangular opening,
said first rectangular opening having a size larger than said exterior surface of said threaded insert, and
said second rectangular opening having a size smaller than said exterior surface of said threaded insert and larger than said exterior slots of said threaded insert such that said second rectangular opening fits within said exterior slots of said threaded insert.

7. The structure according to claim 6, said first plate and said second plate comprising planar plates.

8. The structure according to claim 6, said threaded insert comprising a cube-shaped threaded insert having planar sides.

9. The structure according to claim 8, said exterior slots being on planar sides of said threaded insert that are perpendicular to a planar side in which said threaded opening is located.

10. The structure according to claim 6, said threaded member maintaining said threaded insert in said second rectangular opening.

11. A structure comprising:
a first plate comprising a first opening and tabs extending from a first end of said first plate;
a second plate comprising a round opening and a notch, said notch being in a second end of said second plate and having a rounded portion positioned laterally between flat portions, said round opening being adjacent to said rounded portion of said notch, said tabs being positioned within said flat portions of said notch, and said second plate being connected to said first end of said first plate; and
a locking structure within said first opening, said rounded portion of said notch and said round opening, said locking structure connecting said first plate to said second plate,
said locking structure comprising a threaded member and a threaded insert, said threaded insert comprising a threaded opening having threads corresponding to threads on said threaded member and a post adjacent to said threaded opening, said threaded member being positioned on said rounded portion of said notch, extending from said notch between said tabs and into said threaded opening and fitting screwably within said threaded opening and said post extending from said threaded insert through said round opening such that said post is parallel to said threaded member;
said threaded insert further comprising an exterior surface and at least two exterior slots in said exterior surface,
said first opening comprising two continuous rectangular openings, a first rectangular opening of said rectangular openings being larger than a second rectangular opening of said rectangular openings,
said second rectangular opening being positioned closer to said first end of said first plate than said first rectangular opening,
said first rectangular opening having a size larger than said exterior surface of said threaded insert, and
said second rectangular opening having a size smaller than said exterior surface of said threaded insert and larger than said exterior slots of said threaded insert such that said second rectangular opening fits within said exterior slots of said threaded insert.

12. The structure according to claim 11, said first plate and said second plate comprising planar plates.

13. The structure according to claim 11, said threaded insert comprising a cube-shaped threaded insert having planar sides.

14. The structure according to claim 13, said exterior slots being on planar sides of said threaded insert that are perpendicular to a planar side in which said threaded opening is located.

15. The structure according to claim 11, said threaded member maintaining said threaded insert in said second rectangular opening.

16. A structure comprising:
a first plate comprising a first opening and tabs extending from a first end of said first plate;
a second plate comprising a round opening, a notch, and tab openings on opposite sides of said round opening, said notch being positioned along a second end of said second plate, said tabs being positioned within said tab openings, and a first end of said first plate being connected to said second end of said second plate; and
a locking structure within said first opening and said round opening, said locking structure connecting said first plate to said second plate,
said locking structure comprising a threaded member and a threaded insert, said threaded insert comprising a post and a threaded opening having threads corresponding to threads on said threaded member, said threaded member fitting screwably within said threaded opening;
said post having a size to fit through said round opening of said second plate,
said threaded member having a size to fit within said notch of said second plate,
said threaded insert further comprising an exterior surface and at least two exterior slots in said exterior surface,
said first opening comprising two continuous rectangular openings, a first rectangular opening of said rectangular openings being larger than a second rectangular opening of said rectangular openings,
said second rectangular opening being positioned closer to said first end of said first plate than said first rectangular opening,
said first rectangular opening having a size larger than said exterior surface of said threaded insert, and
said second rectangular opening having a size smaller than said exterior surface of said threaded insert and larger than said exterior slots of said threaded insert such that said second rectangular opening fits within said exterior slots of said threaded insert.

17. The structure according to claim 16, said first plate and said second plate comprising planar plates.

18. The structure according to claim 16, said threaded insert comprising a cube-shaped threaded insert having planar sides.

19. The structure according to claim 18, said exterior slots being on planar sides of said threaded insert that are perpendicular to a planar side in which said threaded opening is located.

20. The structure according to claim 16, said threaded member maintaining said threaded insert in said second rectangular opening.

* * * * *